Oct. 28, 1947.    E. R. WOLFERT ET AL    2,429,657
TWO-PHASE SERVOMOTOR SYSTEM
Filed Nov. 21, 1944    2 Sheets—Sheet 1

INVENTORS
EDWARD R. WOLFERT AND
JOHN H. BROADBENT
BY
a. B. Reavis
ATTORNEY

Oct. 28, 1947.　　　E. R. WOLFERT ET AL　　　2,429,657
TWO-PHASE SERVOMOTOR SYSTEM
Filed Nov. 21, 1944　　　2 Sheets-Sheet 2
FIG. 3
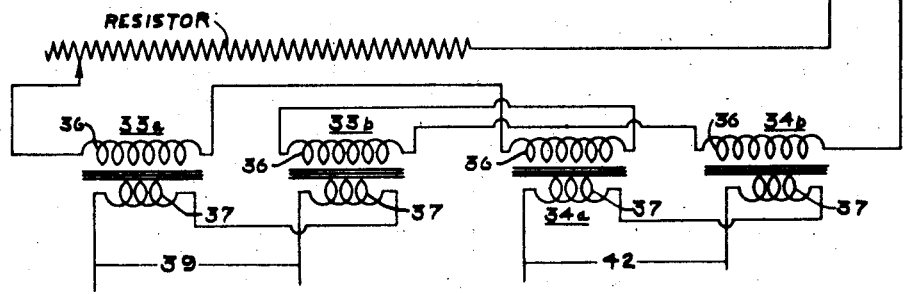
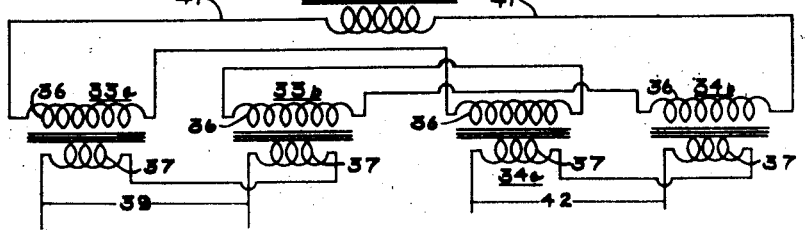
FIG. 4
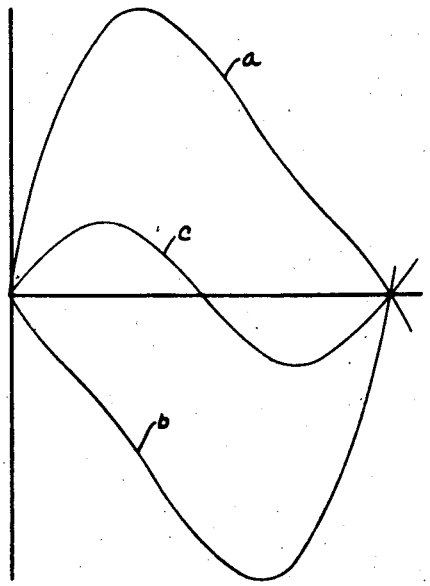
FIG. 5
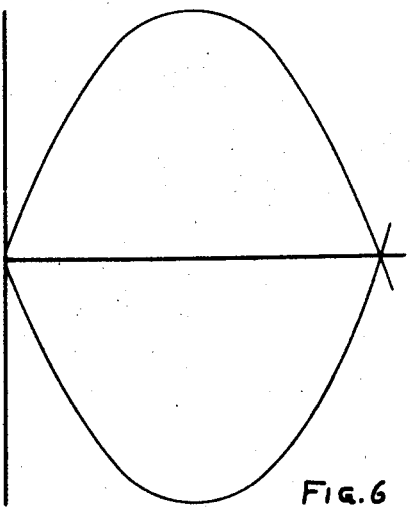
FIG. 6
WITNESSES:
INVENTORS
EDWARD R. WOLFERT AND
JOHN H. BROADBENT
BY
ATTORNEY Patented Oct. 28, 1947

2,429,657

UNITED STATES PATENT OFFICE 2,429,657

TWO-PHASE SERVOMOTOR SYSTEM

Edward R. Wolfert, Springfield, and John H. Broadbent, Longmeadow, Mass., assignors to Westinghouse Electric Corporation, East Pittsburgh, Pa., a corporation of Pennsylvania Application November 21, 1944, Serial No. 564,468

3 Claims. (Cl. 172—239)

The invention relates to an alternating current servo-motor system and it has for an object to provide a follow-up motor of the two-phase type having two field windings, one of which is a control field winding excited by voltage which is varied in magnitude and direction by oppositely-arranged control or magnetic pick-up transformers whose cores have air gaps with which cooperate a relatively movable armature to vary the flux of each core, and it has for an object to provide excitation for the control or magnetic pick-up transformer primaries by means of a transformer supplied from a suitable alternating current source so as to improve the wave form the output voltage of the control or magnetic pick-up transformers utilized to excite the control field winding of the motor, with the result that centering is made more accurate or certain and the servo-motor system has increased accuracy.

A further object of the invention is to provide an alternating current servo-motor system in which the motor has a pair of windings together with means for effecting relative variations of out-of-phase voltages and for applying the latter to the windings to secure follow-up operation of the motor.

In the application of Hanna et al., Serial No. 524,560, filed March 1, 1944, for a Stable element, there is disclosed and claimed, in connection with Figs. 28, 29 and 30 thereof, an alternating current servo-motor system wherein alternating current supplied from a resistor is utilized by gyro-controlled magnetic pick-up transformers to provide output voltages which are amplified and applied to one of the windings of each of two two-phase motors. Each magnetic pick-up transformer includes primary and secondary windings mounted on a core having an air gap whose reluctance is varied by means of a movable armature element in the form of a disk whose axis is kept in the vertical by a gyro. The transformers are arranged quadrantally with respect to the disk and are carried by the level member of the stable element. To keep the level member level or horizontal, there is provided a pair of motors which are connected thereto about axes at right angles. The pairs of opposed magnetic pick-up transformers are arranged so that relative movements thereof and of the armature are in directions normal to said axes, such relative movements being used to control the motors effective about such axes. One or both pairs of the magnetic pick-up transformers move with the level member and relative to the armature as the ship or other support for the stable element moves with respect to one or both of said axes, in consequence of which one or both of the motors are rendered effective to cause the level to follow the apparent motion of the armature element relative to the ship or support. Therefore, with the armature axis maintained in the vertical, the motors are operated to keep a predetermined plane of the level member at right angles to such axis or horizontal. All of the primaries of the magnetic pick-up transformers are connected in series in a circuit supplied through a resistor from a suitable alternating current source and the secondaries of each pair of such transformers are reversely wound and cross-connected. Follow-up operation with accurate centering requires a zero or null voltage condition at center with voltage which increases in a direction dependent upon the direction of movement away from center for operation of the motor in the direction and to the extent required for centering. In an endeavor to improve the accuracy of the arrangement just described, the output voltage of each pair of opposed magnetic pick-up transformers was subjected to oscillographic examination and it was found that the voltage wave, instead of being of the sine form, exhibited a distorted shape indicating a disturbing voltage harmonic responsible for the inability to obtain a zero or no voltage condition at center and because of which the accuracy of follow-up action by the motor was impaired. It was reasoned that the magnetic pick-up transformer iron cores were responsible for the introduction of a harmonic interfering with accuracy of centering. As the resistor supplying the primaries is necessarily high in value, it largely determines the current drawn by the circuit. This means that the exciting current is essentially in phase with the voltage and hysteresis of the iron core will cause distortion of the wave. The resistor was replaced by a supply transformer with greatly improved results. Such a transformer provides for excitation, so that the magnets can draw the current required to give the proper wave.

In addition to improving the wave form of the output voltage of each pair of opposed magnetic pick-up transformers, the field windings of the motors are connected to the supply and to the magnetic pick-up transformers to secure the proper follow-up operation of one or both of the motors, as may be required. Voltages are supplied in locked-phase relation to one of the windings of each of the motors to provide locked fields, and the other windings thereof have applied thereto amplified voltages of the pairs of opposed magnetic pick-up transformers, the latter voltages being in quadrature relation to those supplied to the locked field windings of the respective motors to secure operation of each motor in the direction and to the extent required. One phase of a three-phase source supplies power input transformers of a pair of amplifiers functioning to amplify the outputs of the pairs of magnetic pick-up transformers. The locked field windings of the motors are included in circuits connecting the line wires of said one phase with the midpoints or taps of the amplifier input transformers, with the result that half voltage will be supplied to each such field and the voltages of the fields will be locked in 180 degree phase relation. The remaining line wire of the three-phase source is joined to the midpoints or taps of the input transformers, that is, to the midpoint of said one phase, with the result that there is provided a voltage in quadrature or 90 degree phase relation with respect to that of said one phase. As the quadrature voltage is used to excite the primary of the supply transformer, it is assured that the amplified outputs of the pairs of magnetic pick-up transformers will be in quadrature relation to the voltages used to excite the locked fields. Therefore, with this arrangement, deviation of the armature disk and the magnetic pick-up transformers from centered relation is followed by development of a control voltage or voltages each of the proper magnitude and direction to secure operation of the motor or motors for centering.

Accordingly, a further object of the invention is to provide an alternating current servo-motor system piloted by an armature element movable relative to magnetic pick-up transformers to supply a controlling field of a two-phase motor and wherein a transformer connected to a suitable alternating current source is used to excite the magnetic pick-up transformers to provide the controlling voltage wave form required to give a zero or null voltage condition when the armature and the magnetic pick-up transformers are centered.

A further object of the invention is to provide means utilizing an alternating current source to furnish voltages in locked-phase relation to one pair of windings of two two-phase motors and to supply to the other windings of the latter controlling voltages in quadrature relation with the lock-phase voltages of the respective motors and which controlling voltages are each varied in magnitude and direction to secure operation of the motors to the extent and in the directions required for the desired follow-up operation.

These and other objects are effected by the invention as will be apparent from the following description and claims taken in connection with the accompanying drawings, forming a part of this application, in which:

Fig. 3 is a simplified diagram showing a resistor supplying the magnetic pick-up transformers;

Fig. 4 is a view similar to Fig. 3, but showing the improved arrangement in which a supply transformer is used; and Figs. 5 and 6 are diagrammatic views illustrative of control transformer wave forms, Fig. 5 applying to Fig. 3 and Fig. 6 to Fig. 4.

Figure 1:
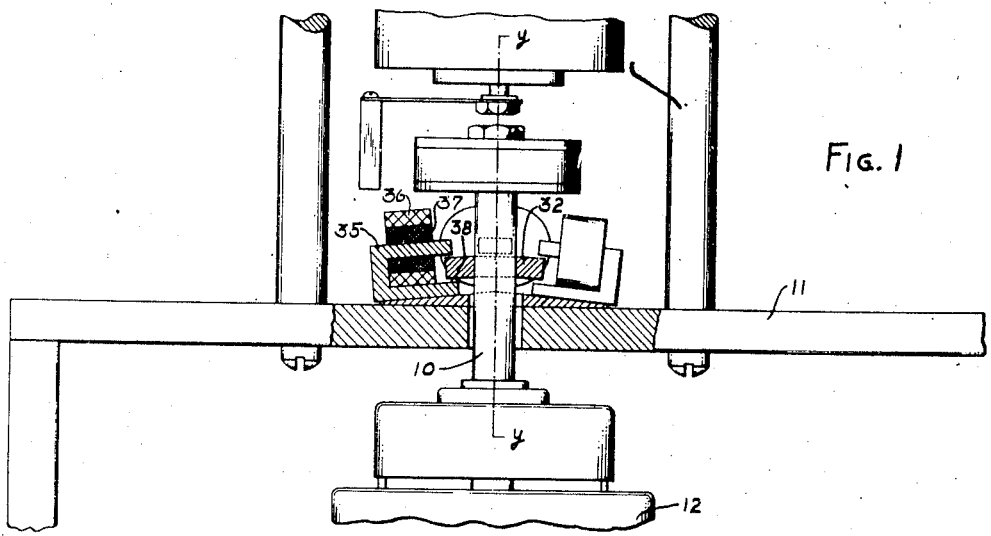
Fig. 1 is a fragmentary view of a portion of a stable element showing parts of the control device which are associated with the present invention.

In the drawings, there is shown a reference member 10 supported in a universal manner from the level member 11 and having a gyro 12 cooperating therewith to maintain its axis $y$—$y$ vertical. A yoke 14, mounted for training movement with respect to the ship or supporting structure, as disclosed in the aforesaid Hanna et al. application, supports a cross level member 15, which, in turn, supports the level member 11, the cross level being pivotally connected to the yoke by the pivots 16, 16 so that the cross level is movable about the axis $z$—$z$ and the level member being pivotally connected to the cross level by the pivots 17, 17 so as to be movable about the level axis $x$—$x$. Motors 18 and 19 are operatively connected to the level member and to the cross level member to effect movement thereof about the level axis $x$—$x$ and the cross level axis $z$—$z$. As will be pointed out, the motors are controlled in response to relative angular movements of the reference and level members to drive the level member about the axes $x$—$x$ and $z$—$z$ so as to keep a predetermined plane of the latter normal to the reference member axis $y$—$y$.

The motors 18 and 19 are each of the two-phase type, such motors including the locked fields 20LF and 21LF, and the control field windings 22CF and 23CF. The control field windings 22CF and 23CF are excited by outputs of the amplifiers 25 and 26, respectively, the amplifiers including power input transformers 27 and 28.

A three-phase alternating current source, at 30, includes phases AB, BC, and CA, and it is provided with three line wires $L_1$, $L_2$, and $L_3$. The phase AB is used to excite the power input transformers as well as the locked fields 20LF and 21LF of the two-phase motors 18 and 19, respectively. The locked field 20LF is connected in series between the line $L_1$ and the midpoints of the power input transformers 27 and 28 and the locked field 21LF is connected in series between the line $L_2$ and the transformer midpoints. This is the equivalent of making a connection to the midpoint of phase AB. Therefore, half voltage excites each locked field and such voltages are in 180° degree phase relation.

Referring now to the means for controlling the excitation of the control fields 22CF and 23CF, the reference member 10 carries an armature element 32 which cooperates with pairs of opposed magnetic pick-up transformers 33a, 33b, and 34a, 34b, the transformers being quadrantly arranged with respect to the armature element 31 and being carried by the level member 11.

Each of the magnetic pick-up transformers 33a, 33b, 34a, and 34b includes a metallic core 35 having primary and secondary windings 36 and 37 mounted thereon. Each metallic core is formed with an air gap 38 with which the armature element cooperates to vary the magnetic flux of the core, the flux of a core being approached by the armature element increasing and that of the core from which the armature element recedes decreasing.

Figure 2:
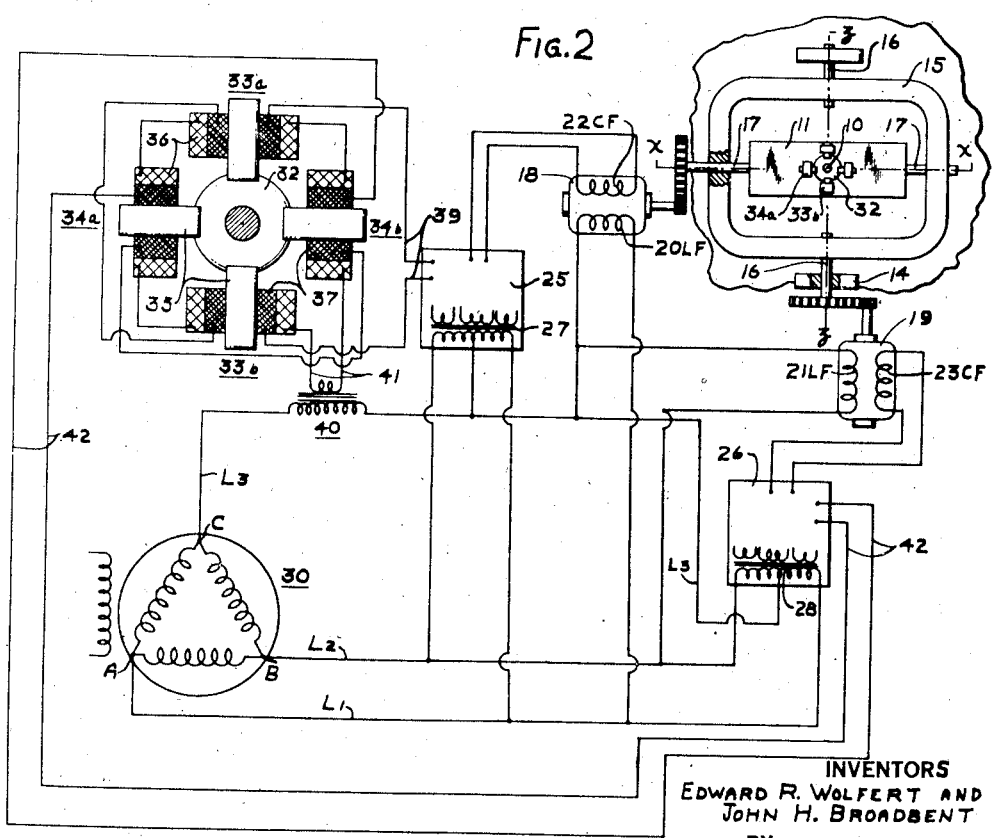
Fig. 2 is a diagrammatic view illustrating the novel control arrangement.

The line wire $L_3$ of the alternating current source 30 is connected to the midpoints of the power input transformers 27 and 28, that is, in mid-point relation with respect to the phase AB, with the result that the voltage in such line wire is in quadrature relation with respect to the voltage of the phase AB and the half phase voltages used to excite the locked field windings 20LF and 21LF. A supply transformer, at 40, is excited by such quadrature voltage and its output circuit 41 has all of the magnetic pick-up transformer primaries 36 connected in series therein (Figs. 2 and 4). The secondaries 37 of the pair of oppositely-arranged transformers 33a and 33b are connected in voltage opposing relation, with the output circuit 39 thereof connected to the amplifier 25 which functions to amplify the magnetic pick-up transformer output voltage for excitation of the control field 22CF. Likewise, the secondary windings 37 of the pair of oppositely-arranged transformers 34a and 34b are connected in voltage opposition, with the output circuit 42 thereof connected to the amplifier 26 which functions to supply amplified voltage to excite the control field winding 23CF.

With the locked fields 20LF and 21LF excited by half voltages furnished from the phase AB, it will be apparent that such voltages will at all times be in 180 degree phase relation. Also, as the line L3 is connected in mid-point relation with respect to the phase AB, it will be apparent that the voltage of such line will be in quadrature phase relation with respect to the phase AB; and, as such quadrature voltage is used to excite the supply transformer, the output voltages of the amplifiers 25 and 26 will be in quadrature phase relation with respect to the voltages used to excite the corresponding locked fields 20LF and 21LF.

Aside from the means just described for using a three-phase alternating current source for applying voltages in quadrature relation to the locked and controlling field windings of the motors, for controlling the directions of such voltages, and for controlling the magnitudes of the voltages applied to the control field windings to cause the motors to operate in the manner required to maintain the level member with a predetermined plane thereof normal to the axis of the reference member, the invention also embraces means to improve the output voltage wave form of each pair of magnetic pick-up transformers, the latter means including a supply transformer connected in the manner already described and whose output is used to excite the primary windings of the magnetic pick-up transformers.

In the aforesaid Hanna et al. application, a resistor was interposed between an alternating current source and the primaries of the pick-up transformers to control the voltage applied to the latter, this arrangement being diagrammatically indicated in Fig. 3. Difficulty was experienced with this arrangement because of error of centering. Oscillographic examination showed that, instead of the pick-up transformer output voltage having a sine wave form, the wave form thereof was distorted, as diagrammatically indicated in Fig. 5, wherein $a$ and $b$ are opposing waves of the cross connected secondaries of a pair of transformers for the central position. From the manner in which the opposing waves of the transformers were distorted at center, it was reasoned that the distortion was occasioned by a voltage harmonic due to core hysteresis and which, because of the exciting current being supplied by the resistor, resulted in the harmonic voltage wave indicated at $c$ in Fig. 5, such harmonic being responsible for the deviation of waves $a$ and $b$ from sine shape.

As the resistor necessarily largely determines the current drawn by a magnetic pick-up transformer, the exciting current of the latter will be essentially in phase with the voltage, and hysteresis of the iron core will induce a voltage harmonic bringing about distortion of the wave form, as shown in Fig. 5. The resistor was replaced by a supply transformer 40, connected as shown in Figs. 2 and 4, with the result that, instead of the series resistance and inductance giving a voltage substantially in phase with the exciting current of the magnetic pick-up transformer, as is the case where a resistor is used, the phase relation of the exciting current is largely determined by the inductance of the pick-up transformer primary, and the required exciting current may, therefore, be drawn to give the proper voltage wave form, as shown in Fig. 6, in which the harmonic voltage wave is reduced substantially to zero and the output voltage waves are of sine form and in opposed relation at center, in consequence of which there exists a zero or null voltage basis for centering. Movement either way from center, of course, produces voltage which when amplified causes the servo-motor to operate in the desired direction.

While the invention has been shown in several forms, it will be obvious to those skilled in the art that it is not so limited, but is susceptible of various other changes and modifications without departing from the spirit thereof.

What is claimed is:

1. In combination, a reference member having a vertical-seeking axis, a level member, means for universally supporting the reference member from the level member, a pair of two-phase motors for moving the level member about axes at right angles to each other and which are transverse to the reference member vertical axis, and means for controlling the energy input to the motors so that the latter drive the level member to maintain a predetermined plane thereof normal to the reference member vertical axis; said means comprising a pair of amplifiers whose outputs are supplied to the respective motors to energize one phase of each of the latter and each amplifier including a power input transformer, a three-phase alternating current source provided with three line wires, a supply transformer, means utilizing a pair of the line wires so that voltage of one phase is effective to excite the power input transformers, means for exciting the other phases of said motors including circuits connected between the line wires of said pair and the mid points of the input transformers, means for connecting the remaining line wire through the primary of the supply transformer in midpoint relation with respect to said one phase to provide a voltage whose phase is in quadrature relation to that of said one phase, first and second pairs of oppositely-arranged magnetic pick-up transformers disposed in quadrantal relation, each magnetic pick-up transformer including a core with primary and secondary windings thereon and each core having an air gap, means connecting the magnetic pick-up transformer primaries in series in the secondary circuit of the supply transformer, means for connecting the secondardies of the respective pairs of magnetic pick-up transformers in voltage opposition and for supplying outputs of the pairs of cross-connected secondaries to the respective amplifiers of the motors, and an armature disk carried by the reference member and arranged coaxially with respect to the vertical axis of the latter, said armature disk cooperating with the core air gaps to control the flux of each core and thereby the outputs of the pairs of connected secondaries supplied to the motors so that, with departure of the magnetic pick-up transformers and the armature from centered relation, the motor or motors are operated to drive the level member to restore the centered relation.

2. In combination, a reference member having a vertical-seeking axis, a level member, means for universally supporting the reference member from the level member, a pair of two-phase motors for moving the level member about axes at right angles to each other and which are transverse to the reference member vertical axis, and means for controlling the energy input to the motors so that the latter drive the level member to maintain a predetermined plane thereof normal to the reference member vertical axis; said means comprising a pair of amplifiers whose outputs are supplied to the respective motors to excite one phase of each of the latter and each amplifier including a power input transformer, a three-phase alternating current source provided with three line wires, a supply transformer, means utilizing a pair of the line wires so that voltage of one phase of the source is effective to energize the power input transformers, means for exciting the other phases of said motors including circuits connected between the line wires of said pair and the mid points of the input transformers, means for connecting the remaining line wire through the primary of the supply transformer in mid-point relation with respect to said input transformers to provide a voltage whose phase is in quadrature relation to that of said one phase, first and second pairs of oppositely-arranged magnetic pick-up transformers disposed in quadrantal relation, each magnetic pick-up transformer including a core with primary and secondary windings thereon and each core having an air gap, means connecting the magnetic pick-up transformer primaries in series in the secondary circuit of the supply transformer, means for connecting the secondaries of the respective pairs of magnetic pick-up transformers in voltage opposition and for supplying outputs therefrom to the respective amplifiers of the motors, an armature disk carried by the reference member and arranged coaxially with respect to the vertical axis of the latter, said armature disk cooperating with the core air gaps to control the flux of each core and thereby the outputs of the pairs of cross-connected magnetic pick-up control transformer secondaries supplied to the motors so that, with departure of the magnetic pick-up transformers and the armature from centered relation, the motor or motors are operated to drive the level member to restore the centered relation.

3. In combination, a reference member having a vertical-seeking axis, a level member, means for supporting the reference member in a universal manner from the level member; means for mounting the level member for movement about axes at right angles and which are transverse to the reference member vertical axis so that a predetermined plane of the level member may be positioned at right angles to the reference member vertical axis; a pair of two-phase motors effective to move the level member about said axes at right angles; a pair of amplifiers whose outputs are supplied to the respective motors to excite one phase of each of the latter and each amplifier including a power input transformer; a three-phase alternating current source provided with three line wires; a supply transformer; means including a pair of line wires so that the one phase of said source may be used to excite said power input transformers; means for exciting the other phases of said motors including circuits connected in mid-point relation with respect to said one phase and to the respective line wires of said pair; means for connecting the remaining line wire through the primary of the supply transformer in mid-point relation with respect to said one phase to provide a voltage whose phase is in quadrature relation to that of the latter; and a control device including relatively movable components carried by the reference and level members, which are centered when the level member is positioned with its said predetermined plane at right angles to the reference member vertical axis, and which utilize said quadrature voltage, upon departure of the components from centered relation, to provide amplifier outputs to render the motors effective to move the level member to restore the centered relation of the components.

EDWARD R. WOLFERT.
JOHN H. BROADBENT.

REFERENCES CITED

The following references are of record in the file of this patent:

UNITED STATES PATENTS

| Number | Name | Date |
|---|---|---|
| 1,136,566 | Usener | Apr. 20, 1915 |
| 1,679,354 | Fairchild et al. | Aug. 7, 1928 |
| 1,959,803 | Wittkuhns | May 22, 1934 |
| 1,959,804 | Wittkuhns et al. | May 22, 1934 |
| 2,054,945 | Nisbet | Sept. 22, 1936 |
| 2,088,659 | Moseley | Aug. 3, 1937 |
| 2,139,558 | Moseley et al. | Dec. 6, 1938 |